United States Patent
Sanchez-Rocha

(10) Patent No.: US 11,544,431 B2
(45) Date of Patent: Jan. 3, 2023

(54) UNIVERSAL WALL BOUNDARY CONDITION TREATMENT FOR K-OMEGA TURBULENCE MODELS

(71) Applicant: Dassault Systemes Simulia Corp., Johnston, RI (US)

(72) Inventor: Martin Sanchez-Rocha, Johnston, RI (US)

(73) Assignee: Dassault Systemes Simulia Corp., Johnston, RI (US)

( * ) Notice: Subject to any disclaimer, the term of this patent is extended or adjusted under 35 U.S.C. 154(b) by 221 days.

(21) Appl. No.: 16/707,163

(22) Filed: Dec. 9, 2019

(65) Prior Publication Data

US 2021/0173985 A1 Jun. 10, 2021

(51) Int. Cl.
  G06F 30/28 (2020.01)
  G06F 17/13 (2006.01)
  G06N 5/02 (2006.01)
  G06T 17/20 (2006.01)

(52) U.S. Cl.
  CPC .............. *G06F 30/28* (2020.01); *G06F 17/13* (2013.01); *G06N 5/02* (2013.01); *G06T 17/20* (2013.01)

(58) Field of Classification Search
  CPC ...... G06F 30/28; G06F 17/13; G06F 2113/08; G06F 2111/10; G06F 30/20; G06F 30/23; G06F 2119/14; G06F 30/27; G06F 30/25; G06F 30/367; G06F 30/398; G06F 2119/22; G06N 5/02; G06T 17/20
  See application file for complete search history.

(56) References Cited

U.S. PATENT DOCUMENTS

| 7,668,705 | B2 * | 2/2010 | Kalitzin | ................. G06F 30/23 703/2 |
| 8,775,140 | B2 * | 7/2014 | Yu | .......................... G06F 17/13 703/9 |

FOREIGN PATENT DOCUMENTS

| CN | 104156525 | 11/2014 |
| CN | 104794293 | 6/2018 |

OTHER PUBLICATIONS

Matt Cable, Thesis "An Evaluation of Turbulence Models for the Numerical Study of Forced and Natural Convective Flow in Atria," Queen's University Kingston, Ontario, Canada, p. 1-148 (Year: 2009).*

David Wilcox, "Formulation of the k-Turbulence Model Revisted,"AIAA Journal vol. 46, No. 11, p. 2823-2838 (Year: 2008).*

(Continued)

*Primary Examiner* — Steven W Crabb
(74) *Attorney, Agent, or Firm* — Fish & Richardson P.C.

(57) ABSTRACT

Disclosed are techniques for simulating a physical process and for determining boundary conditions for a specific energy dissipation rate of a k-Omega turbulence fluid flow model of a fluid flow, by computing from a cell center distance and fluid flow variables a value of the specific energy dissipation rate for a turbulent flow that is valid for a viscous layer, buffer layer, and logarithmic region of a boundary defined in the simulation space. The value is determined by applying a buffer layer correction factor as a first boundary condition for the energy dissipation rate and by applying a viscous sublayer correction factor as a second boundary condition for the energy dissipation rate.

20 Claims, 10 Drawing Sheets

(56) References Cited

OTHER PUBLICATIONS

Tej Prasad Dhakal and D. Keith Walters, "Curvature and Rotation Sensitive Variants of the k-Omega SST Turbulence Model," ASME 2009 Fluids Engineering Division Summer Meeting p. 1-9. (Year: 2009).*
Extended European Search Report in European Appln. No. 20207689.9. dated Apr. 23, 2021, 8 pages.
Pal et al., "CFD simulations of shell-side flow in a shell-and-tube type heat exchanger with and without baffles", Chem. Eng. Sci., Jan. 2016, 143(L6):314-40.
Eça et al., "On the grid sensitivity of the wall boundary condition of the k-ω turbulence model," J. Fluids Eng, Nov. 1, 2004, 126(6):900-10.
Menter, "Two-equation eddy-viscosity turbulence models for engineering applications," AIAA journal, Aug. 1994, 32(8):1598-605.
Wilcox, "Formulation of the kw turbulence model revisited," AIAA journal, Nov. 2008, 46(11):2823-38.
Wilcox, "Reassessment of the scale-determining equation for advanced turbulence models," AIAA journal, Nov. 1988, 26(11):1299-310.

* cited by examiner

UNIVERSAL WALL BOUNDARY CONDITION TREATMENT FOR K-OMEGA TURBULENCE MODELS

BACKGROUND

This description relates to computer simulation of physical processes, such as physical fluid flows.

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). One approach simulate a problem of interest uses the so called SST k-Omega turbulence model, a widely used turbulence model, which solves two partial differential equations (k) and (Omega). One of these equations (k) is for turbulent kinetic energy (TKE) and one of these equations (Omega) is for specific energy dissipation rate (SEDR). The combination of these equations define a turbulent state of a fluid flow.

In principle, it is possible to solve the fluid dynamics governing equations (e.g., the Navier-Stokes equations) to simulate the problem of interest. Unfortunately, most practical engineering problems involve flow conditions that occur at large Reynolds number flows under turbulent flow conditions. This requires the Computational Fluid Dynamic (CFD) simulations solvers to apply turbulence modeling technology to reduce the time and computational model size to practical levels, in order to obtain solutions under such conditions with reasonable computational and time costs. Turbulence modeling is a methodology that approximates the behavior of turbulent fluid flows.

One such model is the shear stress transport formulation of a k-Omega turbulence model or simply "SST k-Omega turbulence model." The SST k-Omega turbulence model involves the solution to two partial differential equations. As is generally true of partial differential equations, the k and the Omega partial differential equations require specifications of boundary conditions in order for those equations to be solved.

While the equation for the turbulent kinetic energy (k) is subject to Dirichlet and Neumann boundary conditions that define integration of this equation with the specific energy dissipation rate (the Omega partial differential equation), the Omega partial differential equation lacks boundary conditions of either the Dirichlet or the Neumann type at wall boundaries, and as such the Omega partial differential equation cannot be readily integrated with the k partial differential equation to provide a solution.

In order to provide a solution that effectively integrates these equations, typically a near-wall analysis is conducted to simplify the Omega partial differential equation to derive an ancillary equation that describes the behavior of the Omega partial differential equation as the wall-boundary is asymptotically approached.

However, while this auxiliary equation is not a formal boundary condition that can be used to solve the Omega partial differential equation, enforcing this equation close to a wall boundary nevertheless allows for a solution. The problem is how to enforce the auxiliary to equation. Various solutions have been proposed. One proposed solution to enforce the auxiliary equation behavior produces additional mesh points to recover asymptotic behavior. Another solution proposed is a modification to the auxiliary equation to enforce the auxiliary equation as a Dirichlet boundary condition.

SUMMARY

As mentioned above a drawback of the specific SST k-Omega turbulence model and more generally of k-Omega models is that the Omega partial differential equation for the specific energy dissipation rate lacks boundary conditions of either the Dirichlet or the Neumann type at the wall boundaries, and as such cannot be readily integrated with the k equation to provide a solution.

Described herein is a generalized wall-boundary condition treatment for the Omega partial differential equation for use in specifying boundary conditions with simulations that use the SST k-Omega turbulence model specifically, and more generally, the solution is applicable to k-Omega turbulence model formulations in general.

The generalized wall-boundary condition described herein automatically imposes correct auxiliary asymptotic relationships needed in the viscous-sublayer and logarithmic-layer and thus eliminates pathological mesh-dependent degradation in accuracy that is exhibited when the viscous-sublayer is not properly resolved by the mesh. The described generalized wall-boundary condition can eliminate the pathological mesh-dependent degradation in accuracy exhibited when the first element away from the wall boundary is located within the buffer layer. In addition, the generalized wall-boundary condition treatment can accurately predict results independently of the location of the first element away from the wall provided that the rest of the boundary layer is properly resolved.

According to an aspect, a computer-implemented method for simulating fluid flow about a simulated physical object includes receiving by one or more computing systems, a model of a simulation space that includes a mesh defining a representation of the physical object in the simulation space, with the mesh comprising plural cells having resolutions to account for surfaces of the physical object, determining boundary conditions for a specific energy dissipation rate of a k-Omega turbulence fluid flow model of the fluid flow, by determining a cell center of a cell in the mesh and computing by the one or more computing systems from the cell center distance and fluid flow variables a value of the specific energy dissipation rate for a turbulent flow that is valid for a viscous layer, buffer layer, and logarithmic region of a boundary defined in the simulation space.

Other aspects include computing systems and computer program products.

One or more of the above aspects can include any one or more of the following features or other features as disclosed below.

For a cell located at a position y+<3 of the boundary where y is a cell at the boundary, the aspects apply a buffer layer correction factor as a boundary condition for the energy dissipation rate. Determining the boundary conditions includes applying by the one or more computing systems, a buffer layer correction factor as a boundary condition for the energy dissipation rate for a cell located at a position y+<3 of the boundary where y is a cell at the boundary, and the correction factor is given according to:

$$\omega'_{Hyb} = f_{blend} \omega_{Hyb}$$

where $\omega'_{Hyb}$ is the correction factor $f_{blend}$ is a blending function and $\omega_{Hyb}$ is a viscus layer correction function Determining the boundary conditions includes applying a viscous sublayer correction factor as a boundary condition for the energy dissipation rate. Determining the boundary conditions further includes applying by the one or more computing systems, a viscous sublayer correction factor as a boundary condition for the energy dissipation rate, with the viscous sublayer correction factor given according to:

$$\frac{\partial \omega_v^f}{\partial y} = \frac{\partial \omega_v^d}{\partial y}\left[\frac{y_1^2 y_2^2}{\left(\frac{y_2+y_1}{2}\right)^4}\right]$$

where $\frac{\partial \omega_v^f}{\partial y}$ is the correction factor, $y_1^2$ is the cell at location 1 and $y_2^2$ is the cell at position 2.

The aspects further include accessing the k-Omega model, initializing the accessed k-Omega model with the determined boundary conditions, and executing the initialized k-Omega model to simulated the fluid flow about the simulated physical object. The aspects further include accessing the k-Omega turbulence fluid flow model, with the k-Omega turbulence fluid flow model, including a first partial differential equation to determine turbulent kinetic energy of the fluid flow; and a second partial differential equation to determine the specific energy dissipation rate of the fluid flow in the simulation space.

The aspects further include determining whether the location is at a buffer layer; and when at a buffer layer, applying a correction that increase the values of energy dissipation rate only at the buffer layer. Applying the correction further includes applying a blending function that acts on the values of energy dissipation rate at the buffer layer and prevents the blending function to affect values at the viscous layer of the boundary defined in the simulation space.

One or more of the above aspects may provide one or more of the following advantages.

The approach to specifying boundary conditions may substantially improve the accuracy of turbulent CFD simulations that use any family of k-Omega models, relative to current boundary condition strategies. The approach removes from predictions mesh-dependency found on meshes that do not properly resolve the viscous-sublayer, unlike current boundary condition strategies. The approach removes or substantially reduces mesh-dependency on meshes whose first grid element away from the wall, resides at the buffer layer, unlike current boundary condition strategies. The approach provides a boundary condition treatment throughout the inner-layer of the turbulent boundary layer that is independent of the location of the first grid point away from the wall, unlike current boundary condition strategies. The approach may generalize the application of boundary conditions for the Omega partial differential equation at the wall, enforcing the viscous-sublayer and logarithmic-layer asymptotic behaviors, unlike current boundary condition strategies.

DETAILED DESCRIPTION

Described below is a generic auxiliary equation that is derived and which correctly reproduces near wall behavior and wall-function limits with a correction that eliminates mesh-dependent solutions in the near-wall limit to provide a practical implementation of the auxiliary boundary condition treatment of the Omega partial differential equation in k-Omega turbulence models used in computation fluid dynamic simulations.

In the discussion below, a boundary condition treatment is introduced for the Omega partial differential equation that is applicable to all the k-Omega turbulence models. In the discussion below, distance from a wall boundary is referred to as "y+n," where "y" is a boundary and "n" is a number of cells away from the boundary, where n is a number that takes as a value of either an integer or a decimal.

The boundary condition approach discussed below references: a viscous sub-layer nominally between y+0.1 to y+5; a logarithmic-layer (log layer) that is a fully turbulent region away from the wall, e.g., y+>25; and a buffer layer that is neither the viscous sublayer nor the fully turbulent logarithmic region and is typically defined by 5<y+<25. Other variations in these ranges are possible.

The boundary condition approach is based on deriving a universal auxiliary relationship for ω that describes the asymptotic behaviors of the Omega partial differential equation in the viscous sub-layer (e.g., a layer that is close to the wall boundary, typically y+5)$\omega_v$, and that is fully compliant with a turbulent equilibrium logarithmic-layer (e.g., a layer distal from the wall, typically y+25, but still within the boundary layer), $\omega_L$. This approach to the auxiliary equation also includes a correction factor that fixes a degradation in accuracy associated with relatively poor mesh-resolution in the viscous-sublayer.

Figure 1:
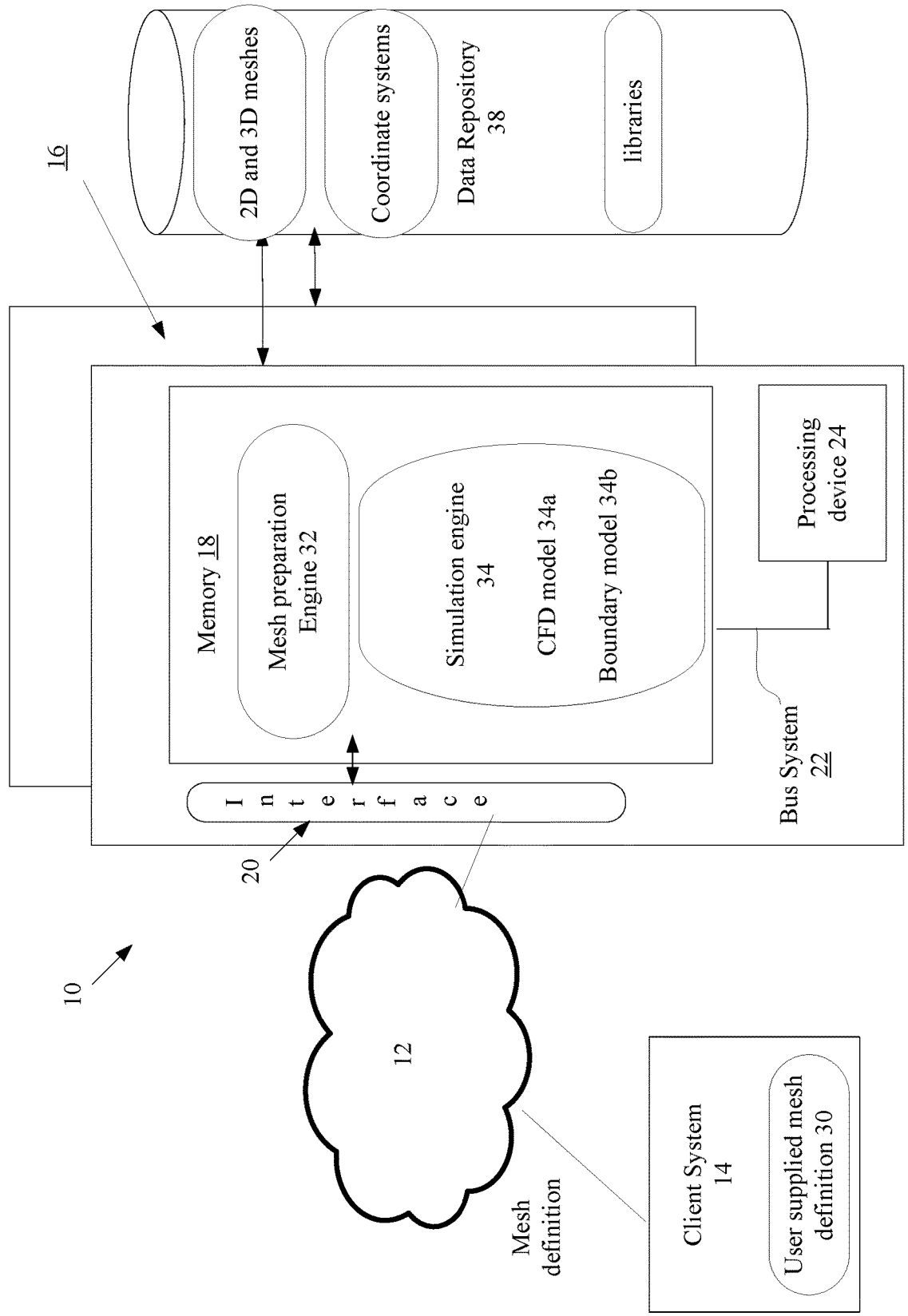
FIG. 1 depicts a system for simulation of fluid flows, which includes a turbulent boundary layer model for compressible or incompressible flows.

Referring now to FIG. 1, a system 10 includes a simulation engine 34 configured for CFD simulations using any model of the family of k-Omega turbulence models. The simulation engine 34 includes a turbulence model module 34a that executes a specific k-Omega turbulence model, and a boundary module 34b that automatically specifies boundary conditions for use with the turbulence model module 34a. The boundary conditions executed in the boundary module 34b are derived from a universal solution for co that satisfies turbulent behavior within a boundary layer. In other words, an auxiliary relationship is provided that describes asymptotic behaviors of the Omega partial differential equation in a viscous sub-layer (e.g., a layer that is close to the wall boundary, e.g., y+5), while being fully compliant with a turbulent equilibrium logarithmic layer (e.g., a layer distal from the wall, e.g., y+25, yet still within the boundary layer).

The system 10 in this implementation is based on a client-server or cloud based architecture and includes a server system 12 implemented as a massively parallel computing system 12 (stand alone or cloud-based) and a client system 14. The server system 12 includes memory 18, a bus system 11, interfaces 20 (e.g., user interfaces/network interfaces/display or monitor interfaces, etc.) and a processing device 24. In memory 18 are a mesh preparation engine 32 and a simulation engine 34.

While FIG. 1 shows the mesh preparation engine 32 in memory 18, the mesh preparation engine can be a third party application that is executed on a different system than server 12. Whether the mesh preparation engine 32 executes in memory 18 or is executed on a different system than server 12, the mesh preparation engine 32 receives a user-supplied mesh definition 30 and the mesh preparation engine 32 prepares a mesh and sends (and or stores) the prepared mesh to the simulation engine 34 according to a physical object that is being modelled for simulation by the simulation engine 34. The system 10 accesses a data repository 38 that stores 2D and/or 3D meshes (Cartesian and/or curvilinear), coordinate systems, and libraries. Any of number physical objects or physical fluid flows can be represented in a simulation space that is used to represent the physical object or physical flow. Simulations can be used in a broad range of technical and engineering problems including aerodynamic/aerospace analysis, weather, environmental engineering, industrial systems, biological systems, general fluid flows, and combustion systems, etc.

Figure 2:
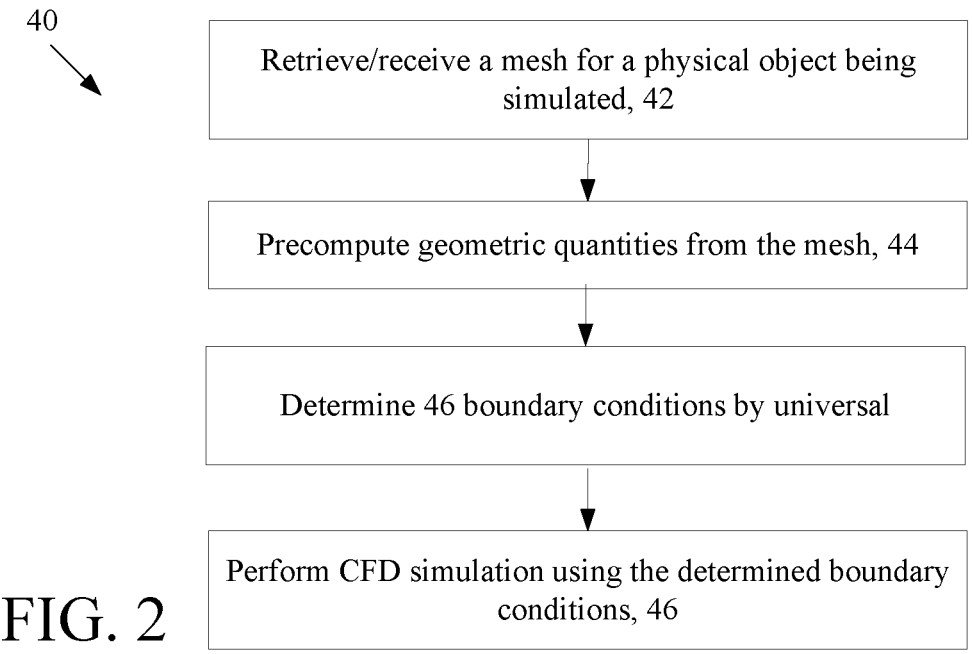
FIG. 2 depicts a flow chart showing operations for formulation of a K-Omega SST turbulence model.

Referring now to FIG. 2, a process 40 for simulating fluid flow about a representation of a physical object is shown. In the example that will be discussed herein, the physical object is an airfoil. The use of an airfoil is merely illustrative however, as the physical object can be of any shape, and in particular can have planar and/or curved surface(s). The process 40 receives 42, e.g., from client system 14 or retrieves from the data repository 38, a mesh (or grid) for the physical object being simulated. In other embodiments, either an external system or the server 12 based on user input, generates the mesh for the physical object being simulated. Other examples include The process precomputes 44 geometric quantities from the retrieved mesh. Process 40 determines 46 boundary conditions (e.g., in the boundary module 34b) based on the retrieved mesh and flow field variables. Flow field variables such as velocity, Omega, k, temperature, etc., are used to compute $\omega_{HCorr}$ for the object being simulated for use in the boundary module 34b. Once the turbulence variables are known, the partial differential equations k and Omega are solved. The turbulence model provides eddy viscosity which represents the effects of turbulence that cannot be resolved by the mesh and is used to advance the solution. The mesh comprises or divides the simulation space into plural cells.

The process performs 48 the computational fluid dynamic simulation (CFD) using a selected k-Omega turbulence model. The model is initialized by the boundary conditions and is executed in turbulence model module 34a, using the precomputed geometric quantities corresponding to the retrieved mesh.

Figure 3:
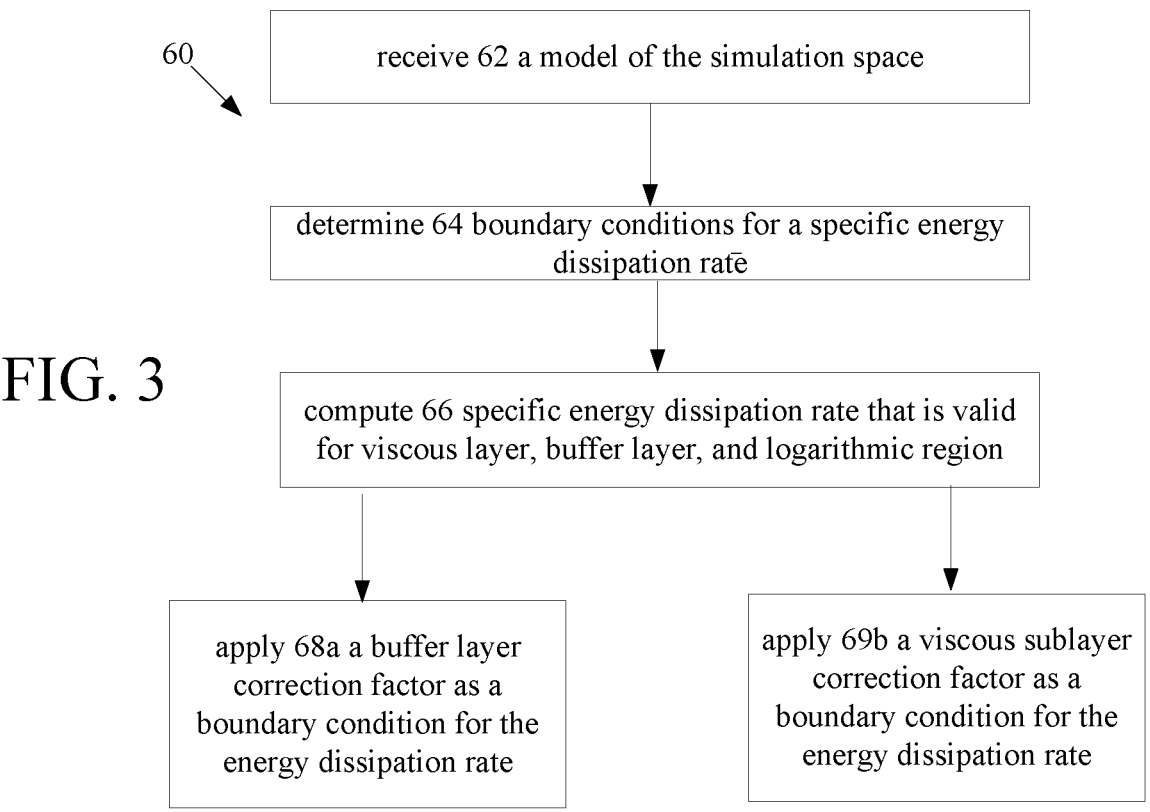
FIG. 3 depicts a flow chart showing operations for correction to determining boundary conditions.

Referring now to FIG. 3, a process 60 for simulating fluid flow about a simulated physical object is shown. The process 60 includes receiving 62 by a computing systems, a model of a simulation space that includes a mesh defining a representation of the physical object in the simulation space, with the mesh comprising plural cells having resolutions to account for surfaces of the physical object. The process 60 also includes determining 64 boundary conditions for a specific energy dissipation rate of a k-Omega turbulence fluid flow model of the fluid flow, by determining a cell center of a cell in the mesh and computing 66 by the one or more computing systems from the cell center distance and fluid flow variables a value of the specific energy dissipation rate for a turbulent flow that is valid for a viscous layer, buffer layer, and logarithmic region of a boundary defined in the simulation space.

The process 60 also includes for a cell located at a position y+<3 of the boundary where y is a cell at the boundary, applying 68a a buffer layer correction factor as a boundary condition for the energy dissipation rate. The process 60 also includes applying 69b a viscous sublayer correction factor as a boundary condition for the energy dissipation rate.

In order to derive the wall-function assumptions, discussed above, the fluid flow is analyzed over a turbulent channel flow. The Reynolds averaged governing equations for an incompressible turbulent channel are given by:

$$\frac{\partial \rho u_i}{\partial t} + \frac{\partial \rho u_j u_i}{\partial x_j} = -\frac{\partial p}{\partial x_i} + \frac{\partial}{\partial x_j}\left[\tau_{ij} - \overline{\rho u_i' u_j'}\right] \quad (1.a)$$

$$\frac{\partial u_j}{\partial x_j} = 0 \quad (1.b)$$

For fully developed flows and no mean span wise velocity, the assumptions are:

$$w = 0, \frac{\partial}{\partial x} = \frac{\partial}{\partial z} = 0 \quad (2.0)$$

The x and z components of a turbulent flow are 0 means that that on average the flow does not change over x and z. However, over those directions, the flow can change instantaneously over portions of a geometric space.

Therefore, the equation for continuity becomes $$\frac{\partial v}{\partial x} = 0, v = c, v(y = 0) = 0, v = 0 \quad (3.0)$$

This implies that advection is zero, and thus the steady state governing equations are as:

$$\frac{\partial p}{\partial x_i} = \frac{\partial}{\partial x_j}[\tau_{ij} - \overline{\rho u_i' u_j'}] \quad (4.0)$$

Evaluating the equation in the Z direction yields $$\frac{\partial p}{\partial z} = \frac{\partial}{\partial y}[\tau_{zy} - \overline{\rho w'v'}], \tau_{zy} = \mu\left(\frac{\partial \cancel{v}}{\cancel{\partial y}} + \frac{\partial \cancel{w}}{\cancel{\partial z}}\right) = 0 \quad (5.0)$$

$$\frac{\partial p}{\partial z} = -\frac{\partial}{\partial y}(\overline{\rho w'v'})$$

This equation balances throughout the Z axis, which means that the gradient of the Reynolds stress is constant and symmetric along the Z axis.

$$\frac{\partial p}{\partial z} = -\frac{\partial}{\partial y}(\overline{\rho w'v'}(z)) = -\frac{\partial}{\partial y}(\overline{\rho w'v'}(-z)) \quad (6.a)$$

This implies that the Reynolds stress is antisymmetric $$\overline{\rho w'v'}(z) = -\overline{\rho w'v'}(-z) \quad (6.b)$$

Thus the Reynolds stress at z=0 is zero $$\frac{\partial p}{\partial z} = 0, p(z) = cte, p = p(x, y, z = 0) \quad (6.c)$$

This means that the pressure does not change over the Z axis and is sufficient enough to "measure" the pressure at the center of the span-wise direction z=0. Evaluating the equation in the Y direction states that the wall-normal Reynolds stress is only function of the wall-normal direction.

$$\frac{\partial p}{\partial y} = \frac{\partial}{\partial y}[\tau_{yy} - \overline{\rho v'v'}], \tau_{zy} = \mu\frac{\partial \cancel{v}}{\cancel{\partial v}} = 0 \quad (5.a)$$

$$\frac{\partial p}{\partial y} = -\frac{\partial}{\partial y}(\overline{\rho v'v'})$$

This can be integrated to yield $$p = -\overline{\rho v'v'} + cte$$

$$p(y) = -\overline{\rho v'v'}(y) + p_{wall} \quad (5.b)$$

From this equation, the pressure gradient in the streamwise direction is equal to the gradient of the pressure at the wall $$\frac{\partial p}{\partial x} = \frac{\partial}{\partial x}(-\overline{\rho v'v'}(y) + p_{wall}) \quad (5.c)$$

$$\frac{\partial p}{\partial x} = \frac{\partial p_{wall}}{\partial x}$$

Evaluating the X-momentum equation using Eq.(5.c) and applying symmetry conditions yields $$\frac{\partial p_{wall}}{\partial x} = \frac{\partial}{\partial y}(\tau_{xy} - \overline{\rho u'v'}), \tau_{xy} = \mu\left(\frac{\partial u}{\partial y} + \frac{\partial \cancel{v}}{\cancel{\partial x}}\right), \quad (6.a)$$

$$\frac{\partial u}{\partial y}(y) = -\frac{\partial u}{\partial y}(-y),$$

$$\overline{\rho u'v'}(y) = -\overline{\rho u'v'}(-y), \frac{\partial p_{wall}}{\partial x} = \frac{\partial}{\partial y}\left(\frac{\partial u}{\partial y} - \overline{\rho u'v'}\right)$$

$$y\frac{\partial p_{wall}}{\partial x} = \mu\frac{\partial u}{\partial y} - \overline{\rho u'v'} + cte, \quad (6.b)$$

$$\overline{\rho u'v'}(y = 0) = 0, cte = -\tau_{wall}$$

Evaluating this equation at the center of the channel y=H yields $$y\frac{\partial p_{wall}}{\partial x} = \mu\frac{\partial u}{\partial y} - \overline{\rho u'v'} - \tau_{wall} \quad (7.a)$$

$$H\frac{\partial p_{wall}}{\partial x} = -\tau_{wall},$$

Thus the pressure drop in the channel can be computed as $$\Delta p = -\tau_{wall}\frac{L}{H} \quad (7.b)$$

The momentum equation can also be written in terms of the total stress $$\frac{\partial p_{wall}}{\partial x} = \frac{\partial}{\partial y}(\tau_{tot}), \tau_{tot} = \tau_{xy} - \overline{\rho u'v'}, \quad (7.c)$$

$$\tau_{tot}(y = H) = 0, \tau_{tot}(y = 0) = \tau_{wall},$$

$$y\frac{\partial p_{wall}}{\partial x} = \tau_{tot} + cte, y\frac{\partial p_{wall}}{\partial x} = \tau_{tot} - \tau_{wall},$$

Using Eq.(7.a) equation (7.c) can be written as $$\tau_{tot} = \tau_{wall}\left(1 - \frac{y}{H}\right), Re_\tau = \frac{\rho u_\tau H}{\mu} \quad (7.c)$$

Therefore, the total stress in the channel can be written as function of y+(Eq.7d), and the Friction Reynolds numbers (Eq. 8.0).

$$\tau_{tot} = \tau_{wall}\left(1 - \frac{y^+}{Re_\tau}\right), \quad (8.0)$$

If this equation is expanded and the so called "law-of-the-wall" is used to compute the velocity gradients Eq.(8.0) can be written as:

$$\mu\frac{\partial u}{\partial y} - \overline{\rho u'v'} = \tau_{wall}\left(1 - \frac{y^+}{Re_\tau}\right), \quad (9.a)$$

where the law of the wall conveys is an universal function that relates the value of the mean velocity profile with y+, this velocity profile is composed by three regions, the viscous sublayer (where the velocity follows a linear function for y+<5), the logarithmic layer (where the velocity follows a logarithmic function for y+>25), and the buffer layer which is a smooth transition function between both layers for $^5{\leq}$y+<25, and at the wall becomes:

$$\tau_{wall}\frac{\partial u^+}{\partial y^+} - \overline{\rho u'v'} = \tau_{wall}\left(1 - \frac{y^+}{Re_\tau}\right), \quad (9.b)$$

So the Reynolds stresses can be exactly computed $$-\overline{\rho u'v'} = \tau_{wall}\left(1 - \frac{y^+}{Re_\tau} - \frac{\partial u^+}{\partial y^+}\right), \quad (9.c)$$

The flow starts becoming turbulent at Re, >100, so $y^+$<5, $u^+$=$y^+$ can be written for the viscous-sublayer as:

$$-\overline{\rho u'v'} = \tau_{wall}\left(1 - \frac{y^+}{Re_\tau} - 1\right), \quad (10.a)$$

$$-\overline{\rho u'v'} - \frac{\tau_{wall}y^+}{Re_\tau} \approx 0$$

This shows that the Reynolds stress is about zero in the viscous-sublayer. In the logarithmic region $y^+$>25, $$u^+ = \frac{1}{\kappa}\ln(y^+) + B,$$

the Reynolds stress is approximated as $$-\overline{\rho u'v'} = \tau_{wall}\left(1 - \frac{y^+}{Re_\tau} - \frac{1}{\kappa y^+}\right), \quad (10.b)$$

$$-\overline{\rho u'v'} \approx \tau_{wall}$$

Therefore, for large enough $Re_\tau$ the Reynolds stress is equal to the wall-shear stress. Moreover, even for a Reynolds stress $Re_\tau$=100, in the logarithmic region $y^+$=25, the equation (10.b) provides $-\overline{\rho u'v'}$=0.6524$\tau_{wall}{\approx}\tau_{wall}$, which is barely turbulent, and for larger Reynolds number – $\overline{\rho u'v'}$=0.9$\tau_{wall}{\approx}\tau_{wall}$, approximately equal to turbulence at the wall or boundary.

The implementation of the production close to the wall is done applying Eq. (9.c) by assuming proximity being very close to the wall and eliminating the second term, which for high $Re_\tau$ should be zero.

$$Pk = -\overline{\rho u'v'}\frac{\partial u}{\partial y} \simeq \tau_{wall}\left(1 - \frac{\partial u^+}{\partial y^+}\right)\frac{\partial u}{\partial y}, \quad (10.d)$$

$$Pk \simeq \frac{\tau_{wall}^2}{\mu}\left(1 - \frac{\partial u^+}{\partial y^+}\right)\frac{\partial u^+}{\partial y^+}.$$

It is possible to relate the wall-shear stress with the turbulence variables. A turbulent kinetic energy budget predicts that in the logarithmic region production balances dissipation $$-\overline{\rho u'v'}\frac{\partial u}{\partial y} = \rho\varepsilon, \quad (11.0)$$

Using the k–ε model the eddy viscosity is written as $$\mu_T = \rho C_\mu \frac{k^2}{\varepsilon} \quad (12.0)$$

Using Eq.(12.0) in (11.0) the wall-shear can be written in terms of the turbulent kinetic energy in the logarithmic layer.

$$-\overline{\rho u'v'}\frac{\partial u}{\partial y} = \rho^2\frac{C_\mu k^2}{\mu_T}, -\overline{\rho u'v'}^2 = \rho^2 C_\mu k^2, \tau_{wall}^2 = \rho^2 C_\mu k^2 \quad (13.0)$$

So the friction velocity $$u_\tau = \sqrt{\frac{\tau_{wall}}{\rho}}$$

can be written as $$u_\tau = C_\mu^{1/4} k^{1/2} \quad (14.a)$$

To compute the values of s in the viscous sublayer and logarithmic region the following relationships can be used. Based on the TKE budget at the wall the diffusion of TKE balances the energy-dissipation rate.

$$v\frac{\partial^2 k}{\partial y^2} = \varepsilon \quad (14.b)$$

This can be integrated as $$k = \frac{\varepsilon y^2}{2v} + C_1 y + C_2 \quad (15.0)$$

Given the boundary condition k (y=0)=0, $C_2$=0, the turbulent kinetic energy can be written as $$k = y\left(\frac{\varepsilon y}{2v} + C_1\right) \quad (16.0)$$

Since the turbulent kinetic energy has to always be positive this requires that $$C_1 \geq -\frac{\varepsilon y}{2v}, \forall\, y \quad (17.0)$$

Further information can be obtained by looking for the location of the critical point, since this point exists and is a minimum by Eq. (14.b).

$$\frac{\partial k}{\partial y} = \frac{\varepsilon y}{v} + C_1 = 0, y = -\frac{C_1 v}{\varepsilon} \quad (18.0)$$

Since the critical point has to be located within the domain y≥0, this imposes that $C_{12} \leq 0$. Imposing both conditions yields $$C_1 \geq -\frac{\varepsilon y}{2v}, \& C_1 \leq 0 \forall y \quad (19.0)$$

Since this holds for all y including y=0, conditions in Eq.(19.0) become $$C_1 \geq 0, \& C_1 \leq 0 \quad (20.0)$$

The only way that equation 20.0 can be true is when $C_1 = 0$, which implies that $$\varepsilon = \frac{2vk}{y^2}, \frac{\partial k}{\partial y}\Big|_{wall} = 0 \quad (21.0)$$

The relationship for the dissipation rate in the logarithmic region can be obtained by substituting Eq.(10.b) on Eq. (11.0)

$$\varepsilon = \tau_{wall}\frac{u_\tau^2}{\mu}\frac{\partial u^+}{\partial y^+} = \tau_{wall}\frac{u_\tau^2}{\mu \kappa y^+} = \frac{u_\tau^3}{\kappa y} \quad (22.0)$$

and by using Eq.(14.a), the logarithmic relationship can be written as $$\varepsilon = \frac{C_\mu^{3/4} k^{3/2}}{\kappa y} \quad (23.0)$$

If eddy viscosity is evaluated using Eq.(23.0), the eddy viscosity can be found to be linear in the logarithmic region.

$$v_T = u_\tau \kappa y \quad (24.0)$$

Near-wall Turbulence Analysis for Plane Channel-Flows

Results that are predicted by the SST k-Omega model have a near-wall dependency on the results. This dependency is due to the near-wall behavior of the Omega (ω) equation when it approaches the near wall region.

Taking the original Model:

$$\frac{\partial \rho k}{\partial t} + \frac{\partial \rho u_j k}{\partial x_j} = 2\tau_{ij} S_{ij} - \beta^* \rho \omega k + \frac{\partial}{\partial x_j}\left[(\mu + \sigma_k \mu_t)\frac{\partial k}{\partial x_j}\right] \quad (25.a)$$

$$\frac{\partial \rho \omega}{\partial t} + \frac{\partial \rho u_j \omega}{\partial x_j} = \frac{\gamma}{v_T} 2\tau_{ij} S_{ij} - \beta \rho \omega^2 + \quad (25.b)$$

$$\frac{\partial}{\partial x_j}\left[(\mu + \sigma_\omega \mu_t)\frac{\partial \omega}{\partial x_j}\right] + 2(1-F_1)\rho\sigma_{\omega 2}\frac{1}{\omega}\frac{\partial k}{\partial x_j}\frac{\partial \omega}{\partial x_j}$$

For steady flows very close to the wall Eq.(1.b) can be simplified to $$v\frac{\partial^2 \omega}{\partial y^2} = \beta \omega^2 \quad (26.0)$$

This equation has the following solution only applicable very close to the wall $$\frac{dV}{dy} = \frac{\beta \omega^2}{v}, V = \frac{d\omega}{dy}, \frac{d\omega}{dV}\frac{dV}{dy} = V, \frac{\beta \omega^2}{v}\frac{d\omega}{dV} = V; \frac{\beta \omega^2}{v} d\omega = VdV, \quad (27.0)$$

$$\frac{\beta \omega^3}{3v} = \frac{V^2}{2}, V = -\sqrt{\frac{2}{3}\frac{\beta \omega^3}{v}}\frac{d\omega}{dy} = -\sqrt{\frac{2}{3}\frac{\beta \omega^3}{v}}, \omega_{Vis} = \frac{6v}{\beta y^2}$$

In order to develop a wall-function formulation the turbulent channel flow analysis previously developed for the energy dissipation rate Eq.(22.0) is used. However, before that is used, the process links ε and ω variables by using the definition of the corresponding eddy viscosity.

$$v_T = \frac{k}{\omega} = C_\mu \frac{k^2}{\varepsilon} \quad (28.0)$$

$$\omega = \frac{\varepsilon}{C_\mu k}$$

With this relationship Eq.(22.0) can be written in terms of ω.

$$\omega_{Log} = \frac{u_\tau}{C_\mu^{1/2} \kappa y} = \frac{u_\tau}{\beta^{*1/2} \kappa y} \quad (29.0)$$

Figure 4:
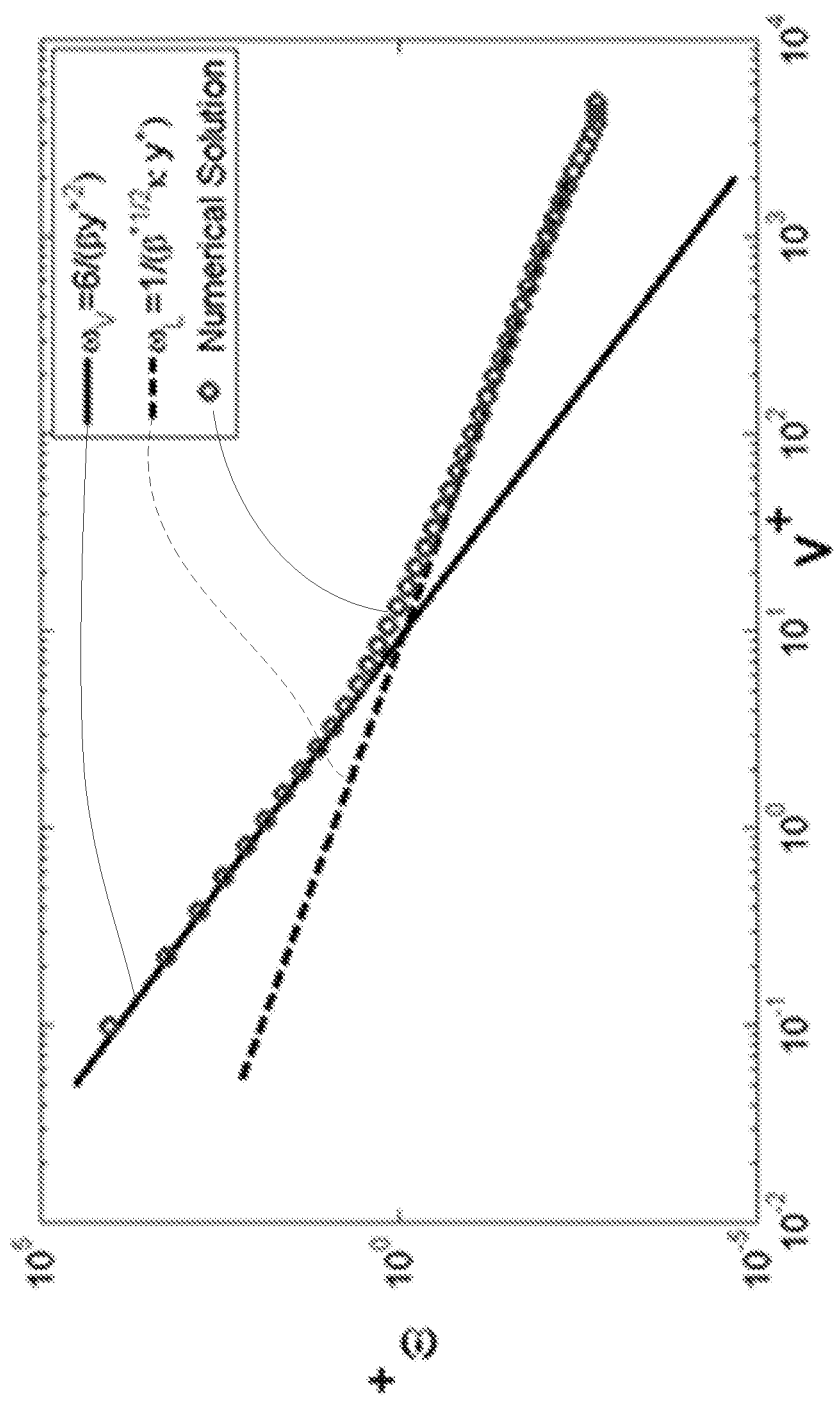
FIG. 4 is a plot that illustrates a solution of the Omega PDE in a turbulent channel flow.

FIG. 4 shows how numerical solutions on a turbulent channel flow predict both limits presented in Eqs.(27) and (29). It is desired to develop an equation that merges both limits.

$$\omega_{Hyb} = \frac{u_\tau}{\beta^{*1/2}\kappa y\left[1 - e^{-\frac{\beta u_\tau y}{6\beta^{*1/2} v\kappa}}\right]} \quad (30.0)$$

Figure 5:
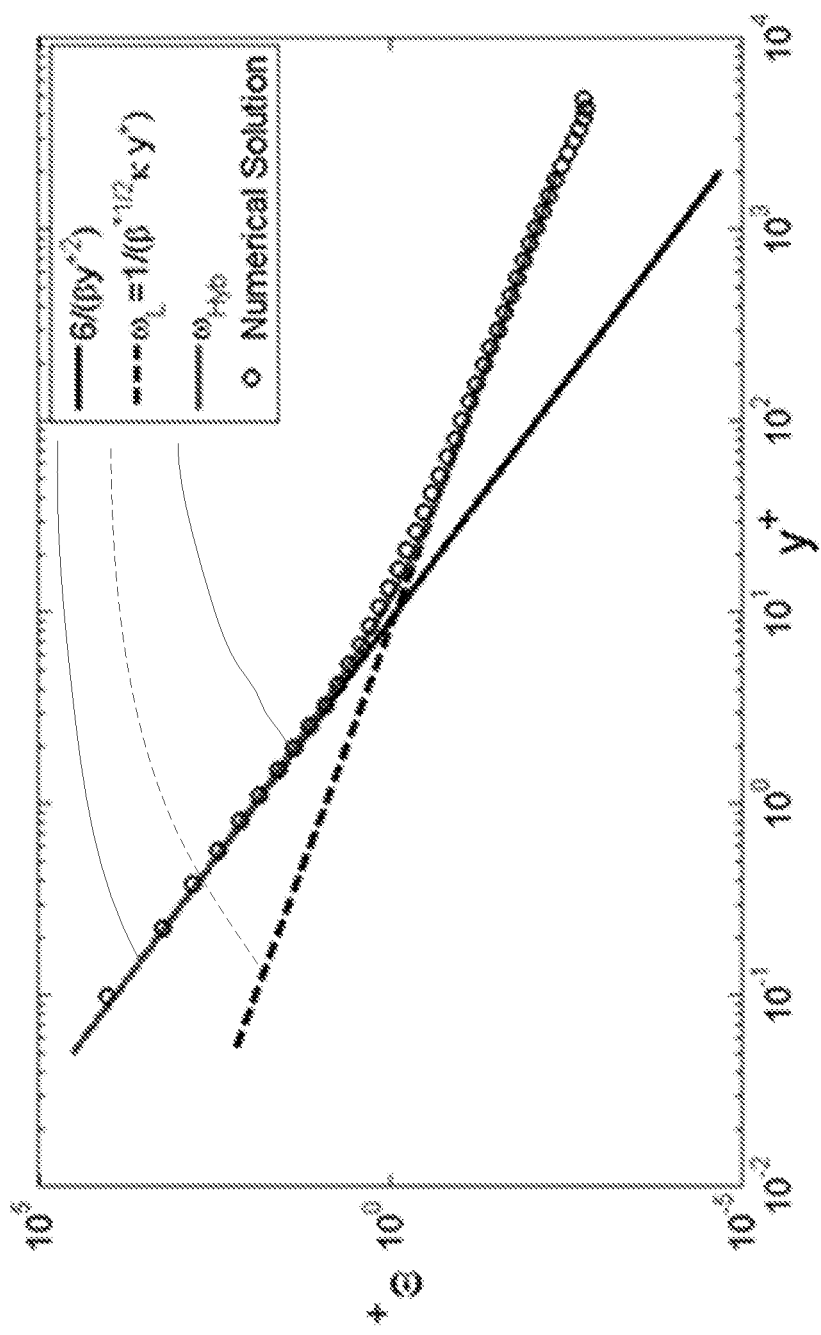
FIG. 5 is a plot that illustrates blending of ancillary relationships for Omega at the viscous sublayer and logarithmic layer.

FIG. 5 shows that an analytical hybrid function, e.g., Eq.30.0, is able to predict very closely, the numerical calculations. FIG. 5 shows effect of blending ($\omega_{hyb}$) of the ancillary relationships for ω at the viscous sublayer y+<5 ($\omega_V$) and logarithmic layer y+>25 ($\omega_L$) which produces the correct ancillary relationship as a function of y+.

Figure 7:
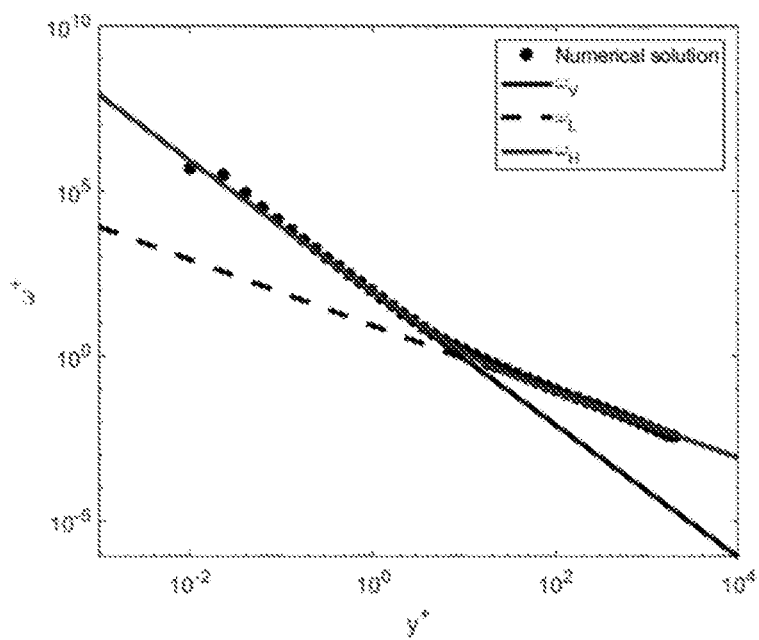
FIG. 7 is a plot that illustrates distribution of Omega and channel flow when near wall resolution is not sufficiently fine in gradation.

The numerical calculations cannot predict with high accuracy the stiff variation of ω in the viscous sublayer if the mesh resolution is not around y+<0.1, e.g., in FIG. 7, when the near-wall resolution is not sufficiently fine in gradation. The numerical calculations shown in circles used a near-wall resolution of y+=0.05. The results show that the value of ω at the first cell does not fall on the theoretical value expected ($\omega_v$) and induces an incorrect distribution of ω on the remaining grid points located at the inner layer (see FIG. 7), where the value of ω (solid circles) are above the $\omega_v$ distribution. Therefore, results show mesh dependency that results because diffusion discretization cannot properly resolve the steep gradients of ω as shown below.

Figure 8:
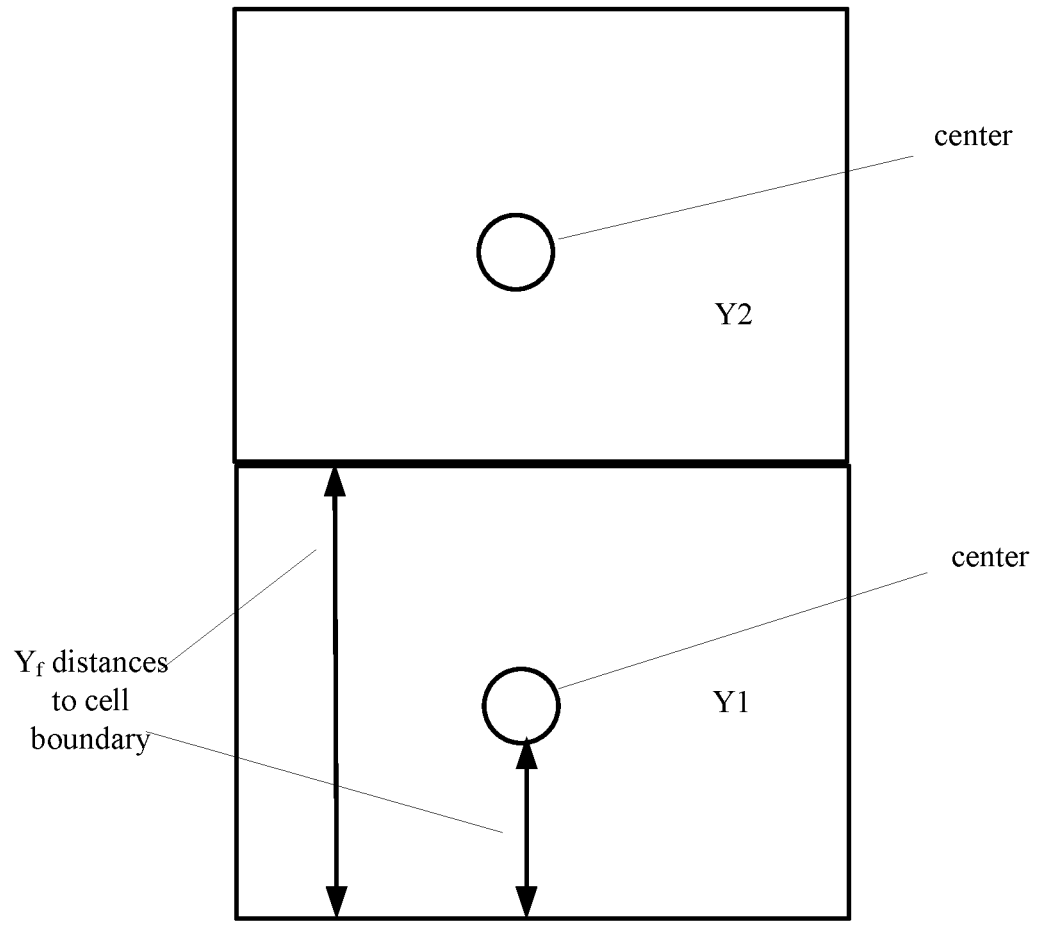
FIG. 8 is a diagram that illustrates two cells close to a boundary.

In the viscous sublayer for y+<2 Eq. 26 needs to be accurately discretized. The solution of Eq. 26 requires enforcing Eq. 30 at the first cell away from the wall Y1, (FIG. 8). However, the diffusion discretization does not adequately recover the analytical gradient of ω at the wall.

$$\omega_v = \frac{c}{y^2}, \frac{\partial \omega_v}{\partial y} = \frac{-2c}{y^3} = \frac{-2\omega_v}{y} \quad (32.a)$$

It is assumed that by specifying the value of ω at the first cell away from the wall, will be sufficient to capture the diffusion flux for the first element that needs the diffusion flux. However, the first cells away from the wall are not integrated, and the values are prescribed using Eq. 30. The finite volume discretization used for the diffusion cannot reproduce the steep variation of ω as is shown below.

$$\frac{\partial \omega_v^d}{\partial y} = \frac{\omega_2 - \omega_1}{y_2 - y_1} = \frac{c}{y_2 - y_1}\left[\frac{1}{y_2^2} - \frac{1}{y_1^2}\right] \quad (32.b)$$

Here by substituting the viscous sublayer behavior of ω, and after, some algebraic manipulation of Eq. 32.b, shows that the gradient of ω at the element face is incorrect:

$$\frac{\partial \omega_v^d}{\partial y} = -\frac{2\omega_f}{\left(\frac{y_2+y_1}{2}\right)}\left[\frac{\left(\frac{y_2+y_1}{2}\right)^4}{y_1^2 y_2^2}\right] \quad (33.0)$$

Figure 9:
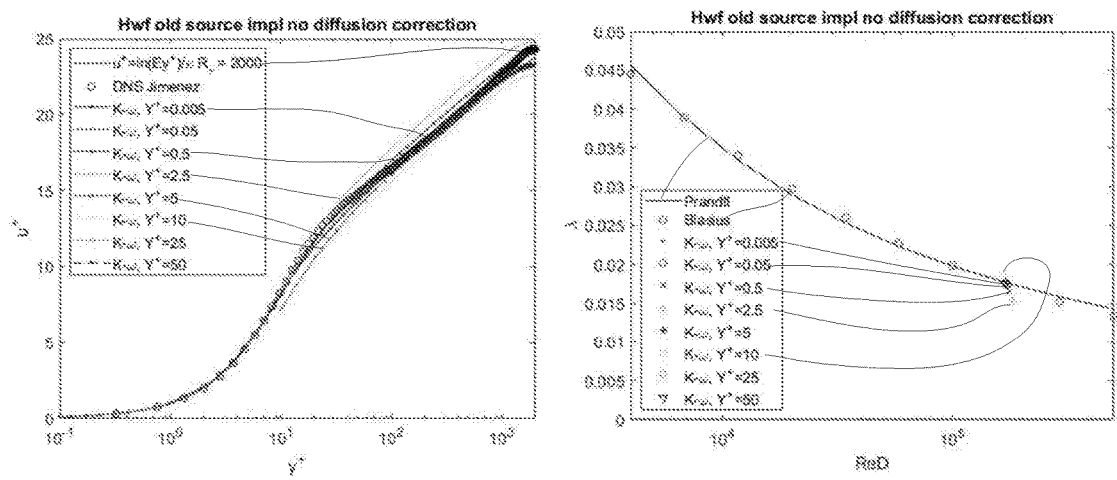
FIG. 9 is a plot that illustrates a mean velocity profile and friction factor for different near-wall resolutions (uncorrected), with plural examples at resolution cases plotted, but only selective ones indicated by a reference line for clarity.

That is, the numerical discretization using the prescribed values of ω will always over predict the diffusion flux, which is why the slope in FIG. 9 is steeper.

However, if the mesh resolution is $y^+ < 0.1$, the first grid point is close enough to the wall to allow the solution to eventually asymptotically approach the correct distribution of ω, even with the incorrect flux induced by Eq. 33.

Figure 6:
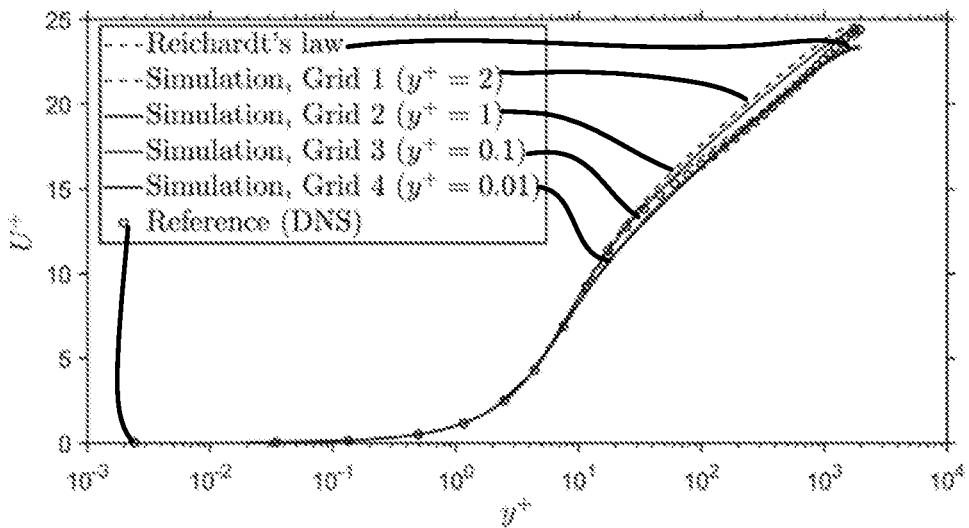
FIG. 6 is a plot that illustrates mesh dependency according to viscous sublayer resolution.

Thus, the overall solution is not changed by any further mesh refinements. However, if the first grid point is located $y+>0.1$, Eq.33 will introduce a larger numerical error that inhibits the solution to asymptotically approach the correct distribution of ω before ω changes towards its log-region value. This will produce errors in the calculations that are mesh dependent, and are more noticeable when the near-wall resolution is found between $0.1 < y^+ < 2$, as shown in FIG. 6.

It is possible to analytically derive the equation for the diffusion of ω, and therefore a correction to the diffusion flux can be introduced (Eq.34) to account for the error in Eq. 33.

$$\frac{\partial \omega_v^f}{\partial y} = \frac{\partial \omega_v^d}{\partial y}\left[\frac{y_1^2 y_2^2}{\left(\frac{y_2+y_1}{2}\right)^4}\right] \quad (34.0)$$

The corrected value of ω is used in the TKE equation preventing over production of TKE associated when ω is damped. It is very important to note that Eq.34 is only correct for $y^+ < 3.5$ where Eq. 33 is valid. In order to show the improvements in accuracy by using Eq. 34, numerical calculations of channel flows showing the predicted velocity profile and friction factor using Eq. 30 are presented below.

FIG. 9 shows typical conventional results that occur when near wall resolutions of $y+<3$ are used, showing that the results are mesh dependent. The lack of accuracy on friction factor and velocity distribution are evident. That is, there are large errors introduced for meshes with near-wall resolution of Y+0.5 and 2.5 (see FIG. 9). Plural resolutions are plotted but only selective ones indicated by a reference line for clarity.

Figure 10:
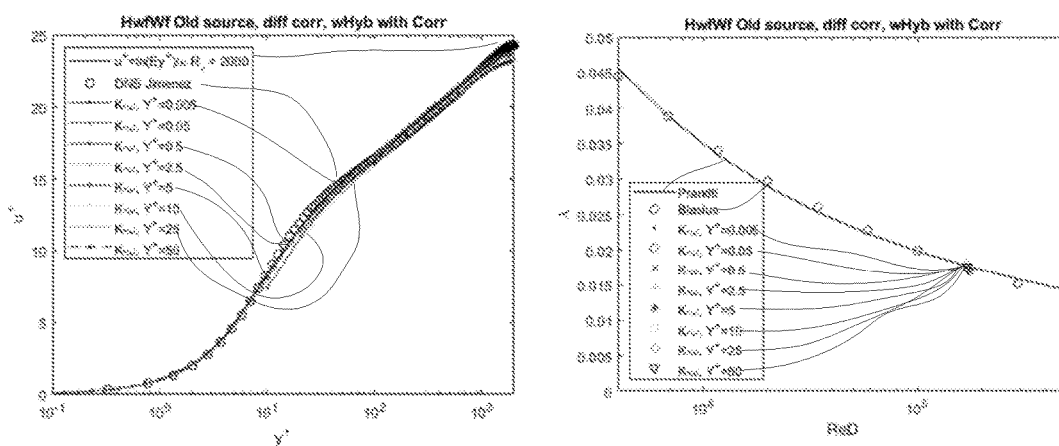
FIG. 10 is a plot that illustrates a mean velocity profile and friction factor for different near-wall resolutions (corrected), with plural examples at resolution cases plotted, but only selective ones indicated by a reference line for clarity.

FIG. 10, however shows that when Eq. 34 is used, the mesh dependency is eliminated, and the accuracy is substantially improved, as shown. Improvements in accuracy on friction factor and velocity distribution with Eq. (34.0) are quite evident. That is, the large errors shown in FIG. 9, which are introduced for meshes with near-wall resolution of Y+0.5 and 2.5 are eliminated for these resolutions, and accurate results are to be expected demonstrating the importance of Eq. 34 to improve the accuracy of calculations. Plural resolutions are plotted but only selective ones indicated by a reference line for clarity.

While errors associated with viscous discretization Eq. (33.0) can be corrected with Eq. 34.0, unfortunately there is another error encountered when the near-wall resolution is located at the buffer layer, where the value of ω neither satisfies the viscous sublayer nor the logarithmic layer.

Figure 11:
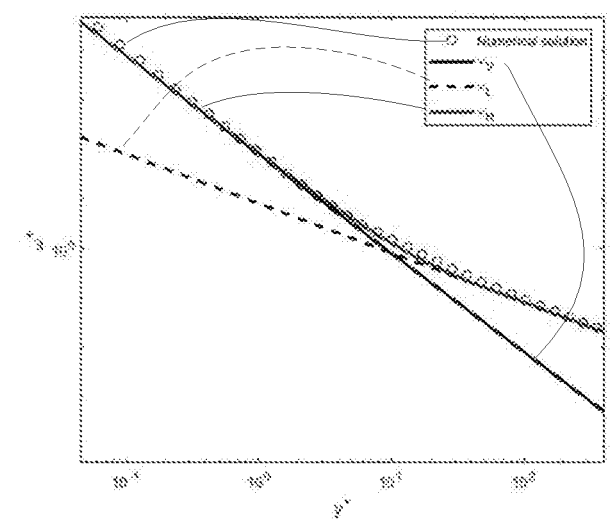
FIG. 11 is a plot that illustrates mismatch of Omega in the buffer layer.

FIG. 11 shows that Eq. 30 is able to predict very closely, the exact solution of the ω's partial differential equation (Eq.25.b), in both the inner and log regions, and while for Eq. 30 the numerical values at the buffer layer are very close to the numerical solutions from Eq. 25.b, the values at the buffer layer are under-predicted.

Figure 12:
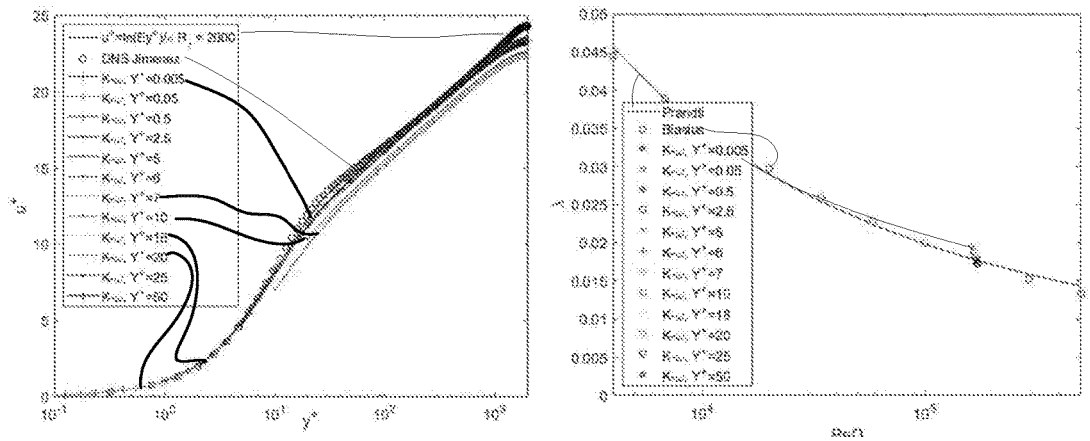
FIG. 12 is a plot that illustrates performance of boundary layer conditions in the buffer layer, with plural examples at resolution cases plotted, but only selective ones indicated by a reference line for clarity.

FIG. 12 illustrates the performance of the new boundary conditions of $(\omega_{hyb})$ when the first grid point away from the wall is located on the buffer layer. This behavior is expected since at the buffer layer ($5 < y+ < 25$) neither $\omega_v$ nor $\omega_L$ are valid behavior. The velocity profile shows an under prediction of the log-layer, which is associated to an increase in friction velocity from what it is expected. As a consequence, the wall-shear is larger, thus increasing the friction factor. The increase in the friction factor is due to a lower value of ω as predicted by Eq. 34 at the first cell when it is located in the buffer layer, as FIG. 10 shows. The lower value of ω induces larger values of TKE and as a consequence larger wall-shear. Plural resolutions are plotted but only selective ones indicated by a reference line for clarity.

In instances, both the viscous sublayer wv and the logarithmic layer value of $\omega_L$ will under-predict the values that are needed at the buffer layer, and thus neither of them nor any average of them would be sufficient.

Therefore, a buffer layer correction that increase the values of ω only at the buffer layer needs to be developed. In order to provide such a correction function Eqs. 27, 29, and 30 will be used in the following way:

$$f_{\omega_{Vis}} = \frac{\omega_{Vis}}{\omega_{Hyb}}, \quad f_{\omega_{Log}} = \frac{\omega_{Log}}{\omega_{Hyb}}, \quad (35.0)$$

$$f_{blend} = f_{\omega_{Vis}} + f_{\omega_{Log}}$$

Figure 13:
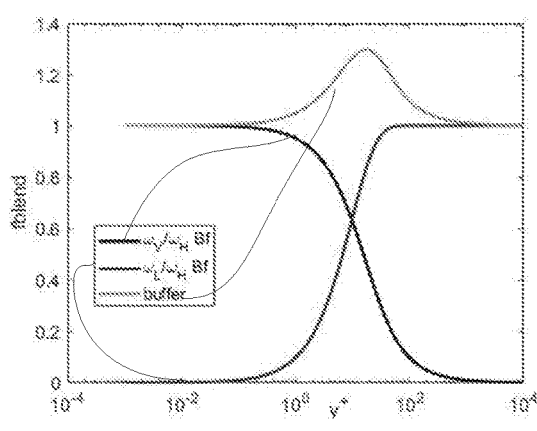
FIG. 13 is a plot that illustrates a blending function that improves accuracy in the buffer layer.

Equation 35 is plotted on FIG. 13, it shows an increase of about 30% in the buffer layer, it also exhibit asymptotic behavior that extends beyond the buffer layer, which can be problematic. The new ω boundary condition equation $\omega_{hyb}$ that is valid for viscous layer, buffer layer, and logarithmic region can be written as:

$$\omega'_{Hyb} = f_{blend}\omega_{Hyb} \quad (36.0)$$

Figure 14:
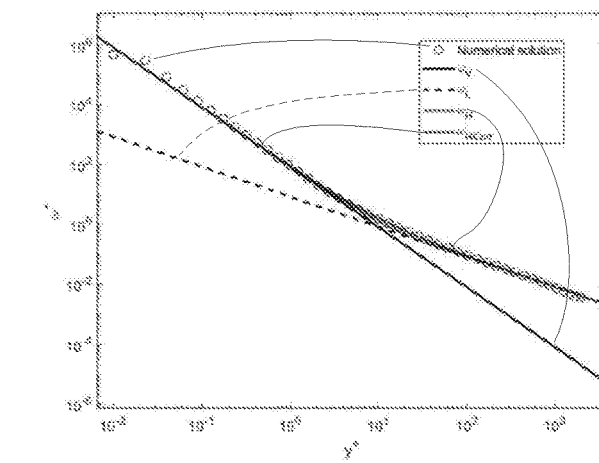
FIG. 14 is a plot that illustrates correction of omega in the buffer layer.

FIG. 14 shows improvement at the buffer layer when Eq. 30 is corrected using Eq. 35. The improvement as illustrated in and at the buffer layer is substantial. Here the behavior of ω inside the inner layer is universal for wall-function theory, thus is Re independent provided the flow is turbulent. These relationships are developed under the assumption of equilibrium and as such can only be expected to work on simulated flows that satisfy the underlying assumptions that lead to the derivation of these equations.

FIG. 14, illustrates an ω relationship that applies the blending function on $\omega_{hyb}$ to produce a function referred as $\omega_{HCorr}$ that is accurate throughout the wall (all y+, viscous sublayer, buffer layer, and logarithmic layer). While, it could be argued that the blending function results would not apply when the flow is not in equilibrium, these are valid as applied to the whole wall-function approach. However, the assumptions, in general, provide near-wall modeling for flows whose conditions depart from the idealizations applied to derive the boundary conditions equations. Therefore, Eq. 36 which recovers the viscous sublayer, logarithmic layer, and provides corrections for mesh independent results at the viscous sublayer and buffer layer can be regarded as the best boundary condition treatment for ω and it is valid as long as the wall-function approach is valid.

Equation 35 has an asymptotic behavior that permeates well into the viscous sublayer and the logarithmic region. Since correction of Eq. 30 need only apply in the buffer layer, the blending function can be limited to act in the buffer layer to prevent affecting the values at the inner layer and log layer which do not need to corrected, as in equation Eq.36.1.

$$\omega'_{Hyb} = f\omega_{Hyb}, \quad f = \begin{cases} f = f_{blend}, & | \ 5.5 < y^+ < 16 \\ f = 1.0, & | \ y^+ < 5.5, \ y^+ > 16 \end{cases} \quad (36.1)$$

Figure 15:
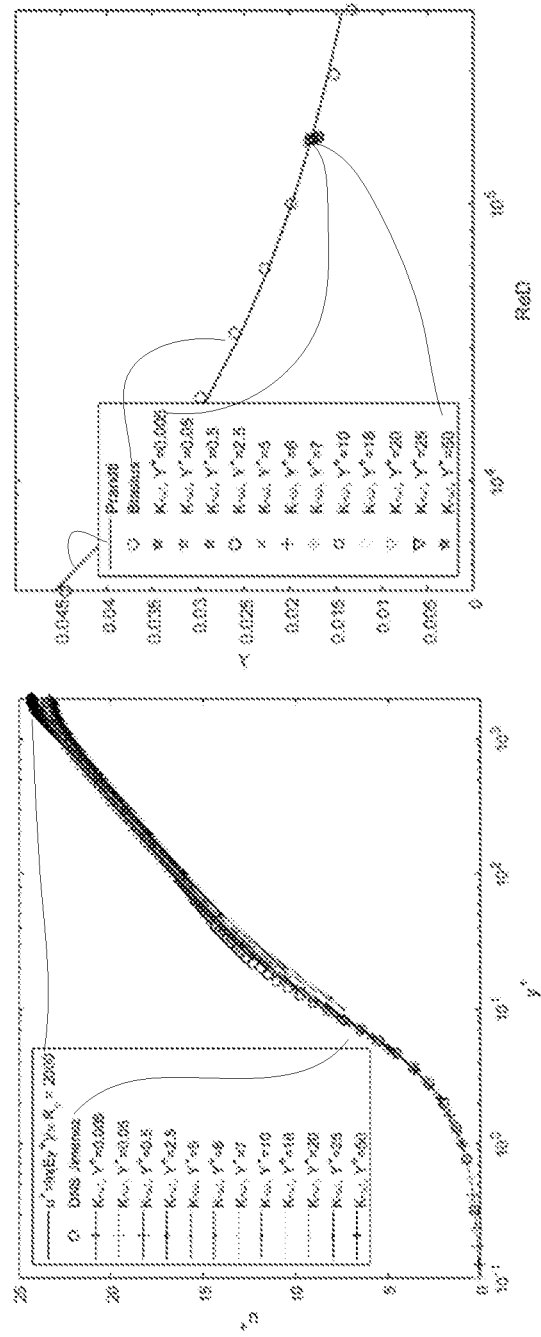
FIG. 15 is a plot that illustrates results of applying a boundary condition correction, with plural examples at resolution cases plotted, but only selective ones indicated by a reference line for clarity.

Results using the viscous sublayer correction (Eq. 34) and the buffer layer correction (Eq. 36.1) improves significantly the accuracy at the near-wall behavior as shown in FIG. 15.

FIG. 15 illustrates results applying the universal boundary condition $\omega_{HCorr}$, which shows significant improvement on results in the buffer layer. Plural resolutions are plotted but only selective ones indicated by a reference line for clarity. While the buffer layer results improve substantially, the predicted friction factor is also in better agreement and the large errors observed in FIG. 11 are substantially removed.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer-implemented method for simulating fluid flow about a physical object, the method comprising:
   receiving by one or more computing systems, a model of a simulation space that includes a mesh defining a representation of the physical object being simulated in the simulation space, with the mesh comprising plural cells having resolutions to account for surfaces of the physical object, and the mesh defining a boundary having a viscous layer, a buffer layer, and a logarithmic region of the boundary;
   determining boundary conditions for a specific energy dissipation rate of a k-Omega turbulence fluid flow model of the fluid flow for a first element away from the boundary, by:
      determining a cell center of a cell in the mesh; and
      computing by the one or more computing systems from the determined cell center and fluid flow variables, a value of the specific energy dissipation rate for a turbulent flow that is valid for the viscous layer, the buffer layer, and the logarithmic region of the boundary defined in the simulation space, to substantially eliminate mesh dependency on meshes whose first grid element away from the boundary resides at the buffer layer.

2. The method of claim 1 wherein for a cell located at a position y+<3 of the boundary where y is a cell at the boundary, the method further comprises:
   applying by the one or more computing systems, a buffer layer correction factor as a boundary condition for the specific energy dissipation rate.

3. The method of claim 1 wherein determining the boundary conditions further comprises:
   applying by the one or more computing systems, a buffer layer correction factor as a boundary condition for the specific energy dissipation rate for a cell located at a position y+<3 of the boundary where y is a cell at the boundary, and the buffer layer correction factor is given according to:

$$\omega'_{Hyb} = f_{blend} \omega_{Hyb}$$

where $\omega'_{Hyb}$ is the buffer layer correction factor, $f_{blend}$ is a blending function, and $\omega_{Hyb}$ is a viscus layer correction function.

4. The method of claim 3 wherein determining the boundary conditions further comprises:
   applying by the one or more computing systems, a viscous sublayer correction factor as a boundary condition for the specific energy dissipation rate, with the viscous sublayer correction factor given according to:

$$\frac{\partial \omega_v^f}{\partial y} = \frac{\partial \omega_v^d}{\partial y} \left[ \frac{y_1^2 y_2^2}{\left(\frac{y_2+y_1}{2}\right)^4} \right]$$

-continued where $\frac{\partial \omega_v^f}{\partial y}$ is the viscous sublayer correction factor, $y_1^2$ is the cell at location 1, and $y_2^2$ is the cell at position 2.

5. The method of claim 1, further comprises:
applying by the one or more computing systems, a viscous sublayer correction factor as a boundary condition for the specific energy dissipation rate.

6. The method of claim 1 wherein determining the boundary conditions further comprises:
applying by the one or more computing systems, a viscous sublayer correction factor as a boundary condition for the specific energy dissipation rate, with the viscous sublayer correction factor is given according to:

$$\frac{\partial \omega_v^f}{\partial y} = \frac{\partial \omega_v^d}{\partial y}\left[\frac{y_1^2 y_2^2}{\left(\frac{y_2+y_1}{2}\right)^4}\right]$$

where $\frac{\partial \omega_v^f}{\partial y}$ is the viscus sublayer correction factor, $y_1^2$ is the cell at location 1, and $y_2^2$ is the cell at position 2.

7. The method of claim 1, further comprising:
accessing the k-Omega model;
initializing the accessed k-Omega model with the determined boundary conditions; and
executing the initialized k-Omega model to simulated the fluid flow about the simulated physical object.

8. The method of claim 1, further comprising:
accessing the k-Omega turbulence fluid flow model, with the k-Omega turbulence fluid flow model, including
a first partial differential equation to determine turbulent kinetic energy of the fluid flow; and
a second partial differential equation to determine the specific energy dissipation rate of the fluid flow in the simulation space.

9. The method of claim 1, further comprising:
determining whether the first element is at the buffer layer; and when at the buffer layer,
applying a correction that increase the values of the specific energy dissipation rate only at the buffer layer by:
applying a blending function that acts on the values of the specific energy dissipation rate at the buffer layer and prevents the blending function to affect values at the viscous layer of the boundary defined in the simulation space.

10. The method of claim 9 wherein applying the correction further comprises:
applying a blending function that acts on the values of the specific energy dissipation rate at the buffer layer and prevents the blending function to affect values at the viscous layer of the boundary defined in the simulation space.

11. A system for simulating a physical process flow about a physical object, the system comprising:
one or more processor devices;
memory operatively coupled to the one or more processor devices;
storage media storing a computer program comprising instructions to cause the system to:
receive a model of a simulation space that includes a mesh defining a representation of the physical object being simulated in the simulation space, with the mesh comprising plural cells having resolutions to account for surfaces of the physical object, and the mesh defining a boundary having a viscous layer, a buffer layer, and a logarithmic region of the boundary;
determine boundary conditions for a specific energy dissipation rate of a k-Omega turbulence fluid flow model of the fluid flow for a first element away from the boundary, by instructions to cause the system to:
determine a cell center of a cell in the mesh; and
compute from the determined cell center and fluid flow variables a value of the specific energy dissipation rate for a turbulent flow that is valid for the viscous layer, the buffer layer, and the logarithmic region of the boundary defined in the simulation space, to substantially eliminate mesh dependency on meshes whose first grid element away from the boundary resides at the buffer layer.

12. The system of claim 11, further configured to:
determine that a cell is located at a position y+<3 of the boundary where y is a cell at the boundary; and
apply a buffer layer correction factor as a boundary condition for the specific energy dissipation rate, with the buffer layer correction factor given according to:

$\omega'_{Hyb} = f_{blend} \omega_{Hyb}$ where $\omega'_{Hyb}$ is the buffer layer correction factor $f_{blend}$ is a blending function and $\omega_{Hyb}$ is a viscus layer correction function.

13. The system of claim 12, further configured to:
apply a viscous sublayer correction factor as a boundary condition for the specific energy dissipation rate, with the viscous sublayer correction factor is given according to:

$$\frac{\partial \omega_v^f}{\partial y} = \frac{\partial \omega_v^d}{\partial y}\left[\frac{y_1^2 y_2^2}{\left(\frac{y_2+y_1}{2}\right)^4}\right]$$

where $\frac{\partial \omega_v^f}{\partial y}$ is the viscus sublayer correction factor, $y_1^2$ is the cell at location 1 and $y_2^2$ is the cell at position 2.

14. The system of claim 12, further configured to:
access the k-Omega model;
initialize the accessed k-Omega model with the determined boundary conditions; and
execute the initialized k-Omega model to simulate the fluid flow about the simulated physical object.

15. The system of claim 11, further configured to:
apply a viscous sublayer correction factor as a boundary condition for the specific energy dissipation rate, with the viscous sublayer correction factor is given according to:

$$\frac{\partial \omega_v^f}{\partial y} = \frac{\partial \omega_v^d}{\partial y}\left[\frac{y_1^2 y_2^2}{\left(\frac{y_2+y_1}{2}\right)^4}\right]$$

where $\frac{\partial \omega_v^f}{\partial y}$ is the viscous sublayer correction factor, $y_1^2$ is the cell at location 1 and $y_2^2$ is the cell at position 2.

16. A computer program product for simulating fluid flow about a physical object, the computer program product tangibly stored on a non-transitory computer readable storage medium, the computer program product comprising instructions to cause a system to:

receive a model of a simulation space that includes a mesh defining a representation of the physical object being simulated in the simulation space, with the mesh comprising plural cells having resolutions to account for surfaces of the physical object, and the mesh defining a boundary having a viscous layer, a buffer layer, and a logarithmic region of the boundary;

determine boundary conditions for a specific energy dissipation rate of a k-Omega turbulence fluid flow model of the fluid flow for a first element away from the boundary, by instructions to cause the system to:

determine a cell center of a cell in the mesh; and compute from the determined cell center and fluid flow variables a value of the specific energy dissipation rate for a turbulent flow that is valid for the viscous layer, the buffer layer, and the logarithmic region of the boundary defined in the simulation space.

17. The computer program product of claim 16, further comprising instructions to cause the system to:

determine that a cell is located at a position y+<3 of the boundary where y is a cell at the boundary; and apply a buffer layer correction factor as a boundary condition for the specific energy dissipation rate, with the buffer layer correction factor given according to:

$$\omega'_{Hyb} = f_{blend} \omega_{Hyb}$$

where $\omega'_{Hyb}$ is the buffer layer correction factor $f_{blend}$ is a blending function and $\omega_{Hyb}$ is a viscus layer correction function.

18. The computer program product of claim 17, further comprising instructions to cause the system to:

apply a viscous sublayer correction factor as a boundary condition for the specific energy dissipation rate, with the viscous sublayer correction factor is given according to:

$$\frac{\partial \omega_v^f}{\partial y} = \frac{\partial \omega_v^d}{\partial y} \left[ \frac{y_1^2 y_2^2}{\left(\frac{y_2 + y_1}{2}\right)^4} \right]$$

where $\frac{\partial \omega_v^f}{\partial y}$ is the viscous sublayer correction factor, $y_1^2$ is the cell at location 1 and $y_2^2$ is the cell at position 2.

19. The computer program product of claim 16, further comprising instructions to cause the system to:

apply a viscous sublayer correction factor as a boundary condition for the specific energy dissipation rate, with the viscous sublayer correction factor is given according to:

$$\frac{\partial \omega_v^f}{\partial y} = \frac{\partial \omega_v^d}{\partial y} \left[ \frac{y_1^2 y_2^2}{\left(\frac{y_2 + y_1}{2}\right)^4} \right]$$

where $\frac{\partial \omega_v^f}{\partial y}$ is the viscous sublayer correction factor, $y_1^2$ is the cell at location 1 and $y_2^2$ is the cell at position 2.

20. The computer program product of claim 16, further comprising instructions to cause the system to:

access the k-Omega model;

initialize the accessed k-Omega model with the determined boundary conditions; and execute the initialized k-Omega model to simulate the fluid flow about the simulated physical object.

* * * * *